United States Patent
Yoshikawa

(10) Patent No.: US 6,922,026 B2
(45) Date of Patent: Jul. 26, 2005

(54) LIGHT FIXTURE CONTROL SYSTEM

(75) Inventor: Toru Yoshikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/793,914

(22) Filed: Mar. 8, 2004

(65) Prior Publication Data
US 2004/0201355 A1 Oct. 14, 2004

(30) Foreign Application Priority Data
Mar. 13, 2003 (JP) ........................................ 2003-067992

(51) Int. Cl.$^7$ ................................................ B60Q 1/08
(52) U.S. Cl. ........................ 318/152; 307/10.8; 318/558
(58) Field of Search ................................ 318/139, 140, 318/148, 151–153, 434, 504, 505, 558; 307/9.1, 10.1, 10.8

(56) References Cited
U.S. PATENT DOCUMENTS 3,902,217 A * 9/1975 Botz et al. ............... 15/250.02
5,780,973 A * 7/1998 Lively et al. .................. 315/80
6,570,369 B2 * 5/2003 Tamai et al. ................ 323/288
6,600,237 B1 * 7/2003 Meissner ...................... 307/34
6,765,776 B2 * 7/2004 Kelwaski .................... 361/93.9

FOREIGN PATENT DOCUMENTS

| GB | 2 084 767 A | * | 4/1982 |
| JP | 59-13333 U | | 1/1984 |
| JP | 63-58132 B2 | | 11/1988 |

* cited by examiner

Primary Examiner—Bentsu Ro
(74) Attorney, Agent, or Firm—Birch, Stewart, Kolasch & Birch, LLP

(57) ABSTRACT

To provide a light fixture control system with which an inrush current is prevented at the time of motor activation, and a light fixture is prevented from rapidly dimming. In a vehicle including a light fixture to be driven by an output of a generator of the vehicle, and a motor to be driven also by the output of the generator, when the light fixture is driven, the driving current $F_1$ to the motor is duty-controlled.

16 Claims, 3 Drawing Sheets

LIGHT FIXTURE CONTROL SYSTEM

CROSS-REFERENCE TO RELATED APPLICATIONS

This nonprovisional application claims priority under 35 U.S.C. § 119(a) on Patent Application No. 2003-067992, filed in Japan on Mar. 13, 2003, the entirety of which is incorporated herein by reference.

BACKGROUND OF THE INVENTION

1. Field of the Invention

The present invention relates to a light fixture control system with which a light fixture is prevented from dimming due to an inrush current occurring when a fan motor is activated.

2. Description of Background Art

Conventionally, in vehicles such as motorcycles, radiator fan motors are driven when engine cooling water is increased in temperature to be a predetermined threshold value or higher (refer to Japanese patent publication No. Sho-63-58132 and Japanese Utility Model Laid-Open No. Sho-59-13333 as examples).

Referring to FIG. 3 of the present invention, a description of when the driving current of a fan motor turns ON and OFF is set forth. The fan motor is triggered to turn ON and OFF by the cooling water of a radiator reaching a threshold value. The fan is driven to lower the temperature of the cooling water through the radiator.

In the above conventional example, as described in the foregoing, when the fan motor turns from ON to OFF, as shown in section A of FIG. 3, current flowing in the fan motor is considerably higher for a short time than the current when the motor is stationary.

Thus, when the headlights or taillights of a vehicle are on, for example, during night driving, the voltage (light voltage) of the headlight or taillight connected to the same power supply is affected by the occurrence of an inrush current and therefore rapidly drops.

As a result, if a vehicle includes no battery to reduce weight and give a higher priority to mobility, it is necessary to prevent such a voltage drop because of dependence on an AC generator for the power supply. Therefore, the electric power generation capability of the AC generator has to be increased, or the amount of light of the headlights and taillights has to be reduced. Accordingly, the cost of the vehicle will be increased.

SUMMARY OF THE INVENTION

The present invention has been proposed in consideration of such circumstances, and an object thereof is to provide a light fixture control system with which an inrush current is prevented at the time of motor activation, and a light fixture is prevented from rapidly dimming with reliability at low cost.

The present invention is proposed to solve the above problems, and is directed to a light fixture control system (e.g., an ECU 6 in one embodiment) having a connection established with a light fixture (e.g., a headlight 3 or a taillight 4 in one embodiment) to be driven by an output of a generator (e.g., a generator 1 in one embodiment) of a vehicle (e.g., a motorcycle and other vehicles in one embodiment) and a motor (e.g., a fan motor 5 in one embodiment) to be driven also by the output of the generator. In addition, a driving current provided to the light fixture and the motor is controlled, wherein the driving current to the motor is duty-controlled at the time of driving the light fixture.

With such a structure, when the light fixture is on, and the motor receives an input of the driving current from the same generator as for the light fixture, the current supply can be gradually increased by duty control.

Furthermore, in the present invention, based on the lapse of time after the duty control is started, the energization time is increased to provide the driving current to the motor.

With such a structure, when the light fixture is on, and the motor receives an input of the driving current from the same generator as for the light fixture, the current supply can be gradually increased by duty control based on the lapse of time after the duty control is started.

Furthermore, in the present invention, a parallel connection is established with respect to the generator between the light fixture and the motor.

With such a structure, the voltage applied to the motor is the same as the voltage to be input to the light fixture from the same generator as for the light fixture.

In addition, in the present invention, the motor is a fan motor provided to a heat source.

With such a structure, in a fan motor which frequently switches the motor operating condition between ON and OFF in response to the temperature change of the heat source, when the light fixture is on, the current supply can be gradually increased by duty control.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
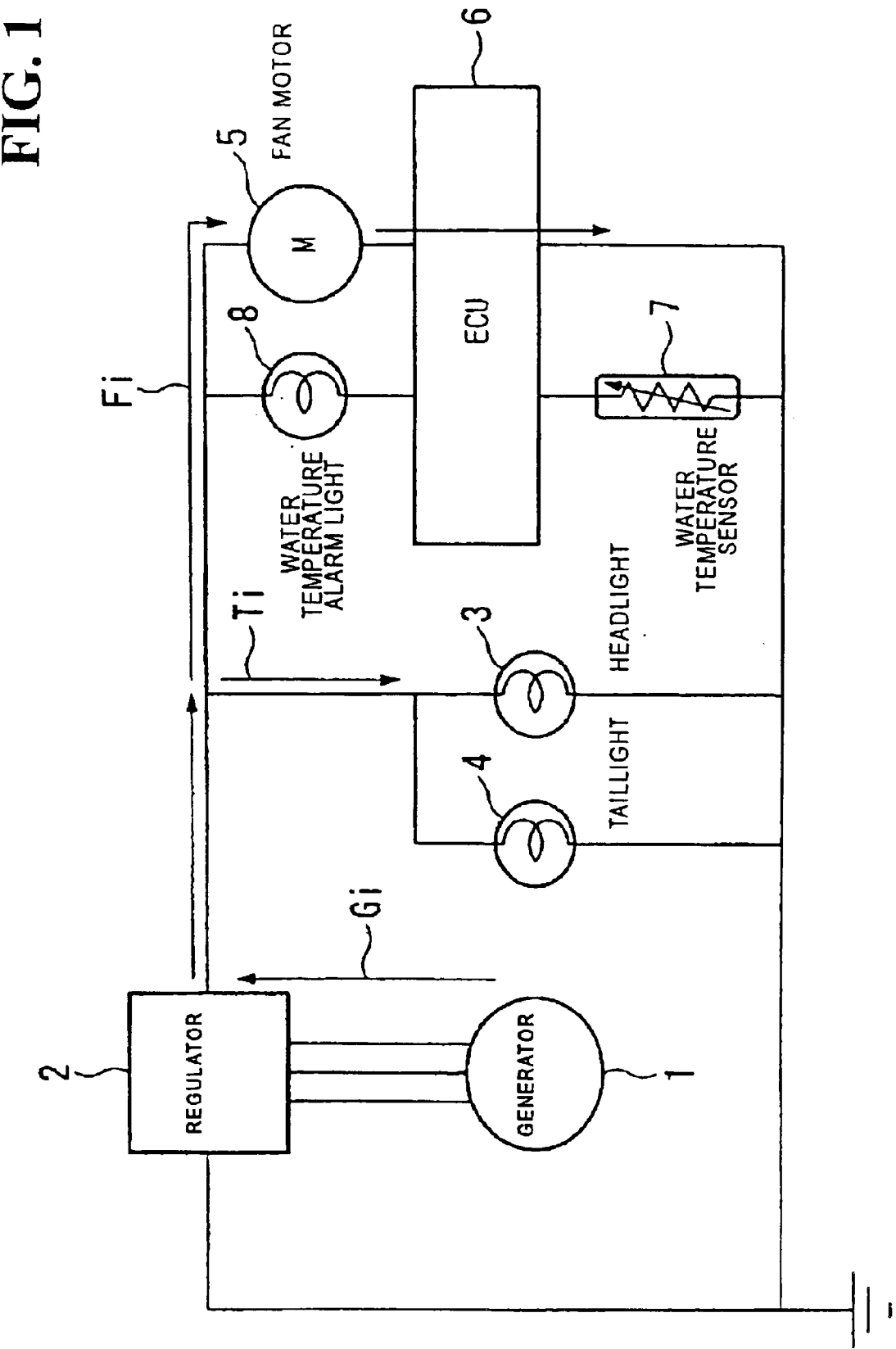
FIG. 1 is a diagram showing the structure of a vehicle to which a light fixture control system of one embodiment of the present invention is applied.

In the below, an embodiment of the present invention will be described with reference to the accompanying drawings. FIG. 1 is a diagram showing the structure of a vehicle, to be specific, a motorcycle to which a light fixture control system of the present embodiment is applied. For brevity, FIG. 1 shows only the structure of the vehicle applied with the light fixture control system, having a relevance to light fixture control. Current supply lines and signal supply lines are indicated by the same lines.

The vehicle applied with the light fixture control system of one embodiment is structured by: a generator 1; a regulator 2; a headlight 3 (light fixture); a taillight 4 (light fixture); a fan motor 5 (motor); an ECU 6 (light fixture control system); a water temperature sensor 7; and a water temperature alarm light 8. No battery is included in the light fixture control system.

In the vehicle, the generator 1 is a generator for providing a power supply to each component (regulator 2, headlight 3, taillight 4, fan motor 5, ECU 6, water temperature sensor 7, water temperature alarm light 8, and other components). The generator 1 generates electric power utilizing engine rotation.

The regulator 2 converts the voltage output from the generator 1 into a voltage value required by each component (headlight 3, taillight 4, fan motor 5, ECU 6, water temperature sensor 7, water temperature alarm light 8). At this time, the regulator 2 performs such voltage conversion by converting the voltage difference between the voltage output from the generator and the required voltage before emission into heat.

The headlight 3 is a light establishing a parallel connection with the fan motor 5 with respect to the generator (the generator 1 and the regulator 2 in the embodiment), and is driven in response to an input of the light fixture voltage adjusted by the regulator 2. The headlight 3 is, mainly, provided in the front part of the vehicle to illuminate ahead of the vehicle.

Similarly to the headlight 3, the taillight 4 is a light establishing a parallel connection with the fan motor 5 with respect to the generator, and is driven in response to an input of the light fixture voltage adjusted by the regulator 2. The taillight 4 is, mainly, provided in the rear part of the vehicle to illuminate behind the vehicle.

The fan motor 5 is provided to a radiator (not shown) for cooling the engine as a heat source, and in response to a voltage input adjusted by the regulator 2, rotates the fan to air-cool the radiator by the fan rotation.

The ECU 6 is a vehicle light fixture control system for controlling the driving current to the light fixtures (headlight 3 and taillight 4) and the motor (fan motor 5). When the motor is driven based on the temperature information (water temperature value coming from the water temperature sensor 7) of the heat source, the system applies duty control to the driving current $F_i$ for the motor before output.

That is, based on the lapse of time after the duty control is started, the ECU 6 increases the energization time of the driving current $F_i$ for the motor (will be described further below).

The water temperature sensor 7 is a sensor for measuring the temperature information (water temperature value) of the heat source, and with respect to the ECU 6, always provides the temperature information derived through measurement.

The water temperature alarm light 8 is an indicator light, which warns a user by turning on, based on a command signal coming from the ECU 6. The water temperature alarm light 8 is turned on when the temperature information derived through measurement by the water temperature sensor 7 exceeds a predetermined threshold value.

Figure 2:
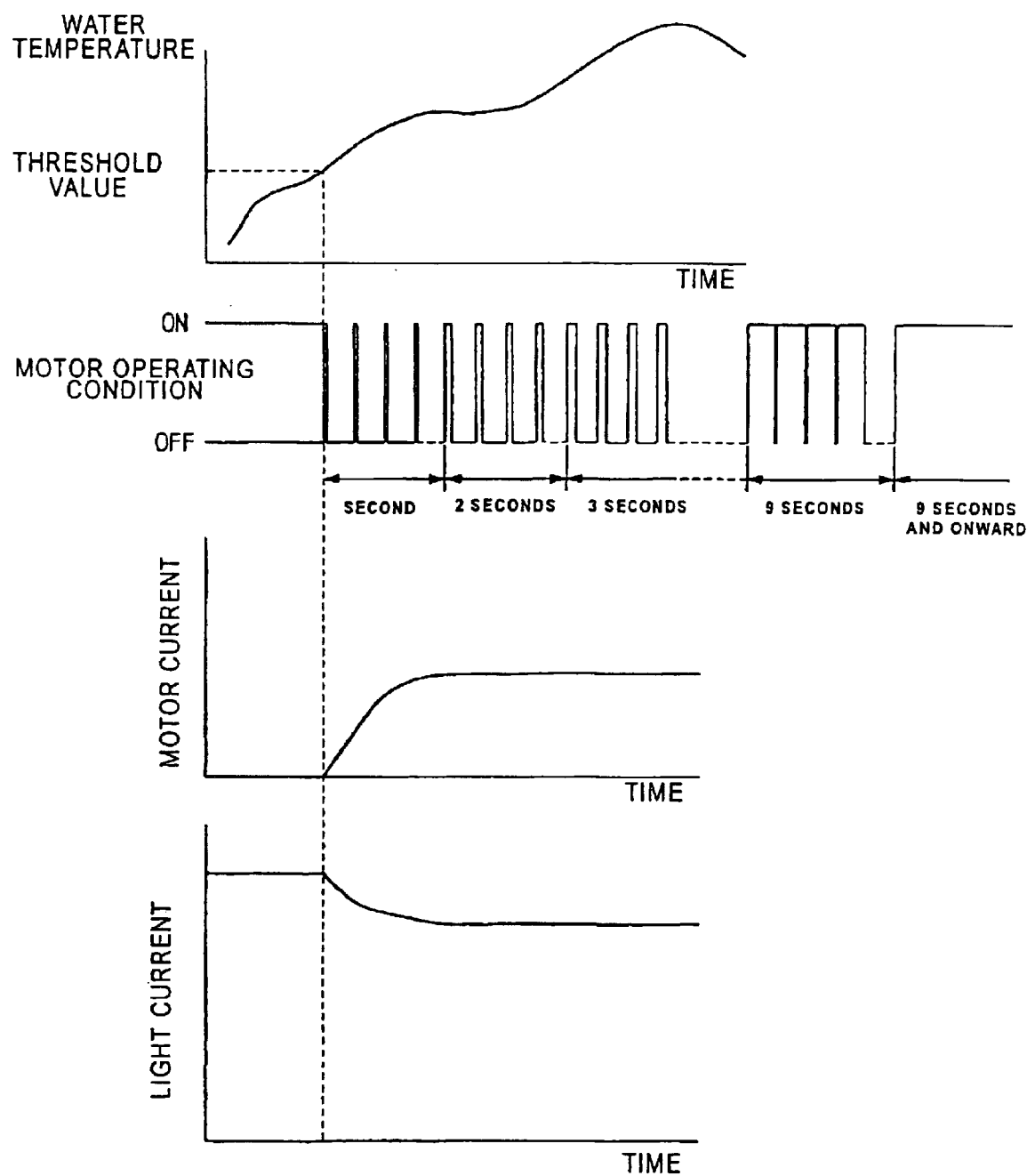
FIG. 2 is a diagram showing, in the process of duty control by the light fixture control system of one embodiment, the time-varying water temperature value of a radiator, the time-varying ON/OFF of the driving current of a fan motor, the time-varying current value of the fan motor, and the time-varying voltage value of a light fixture.
Figure 3:
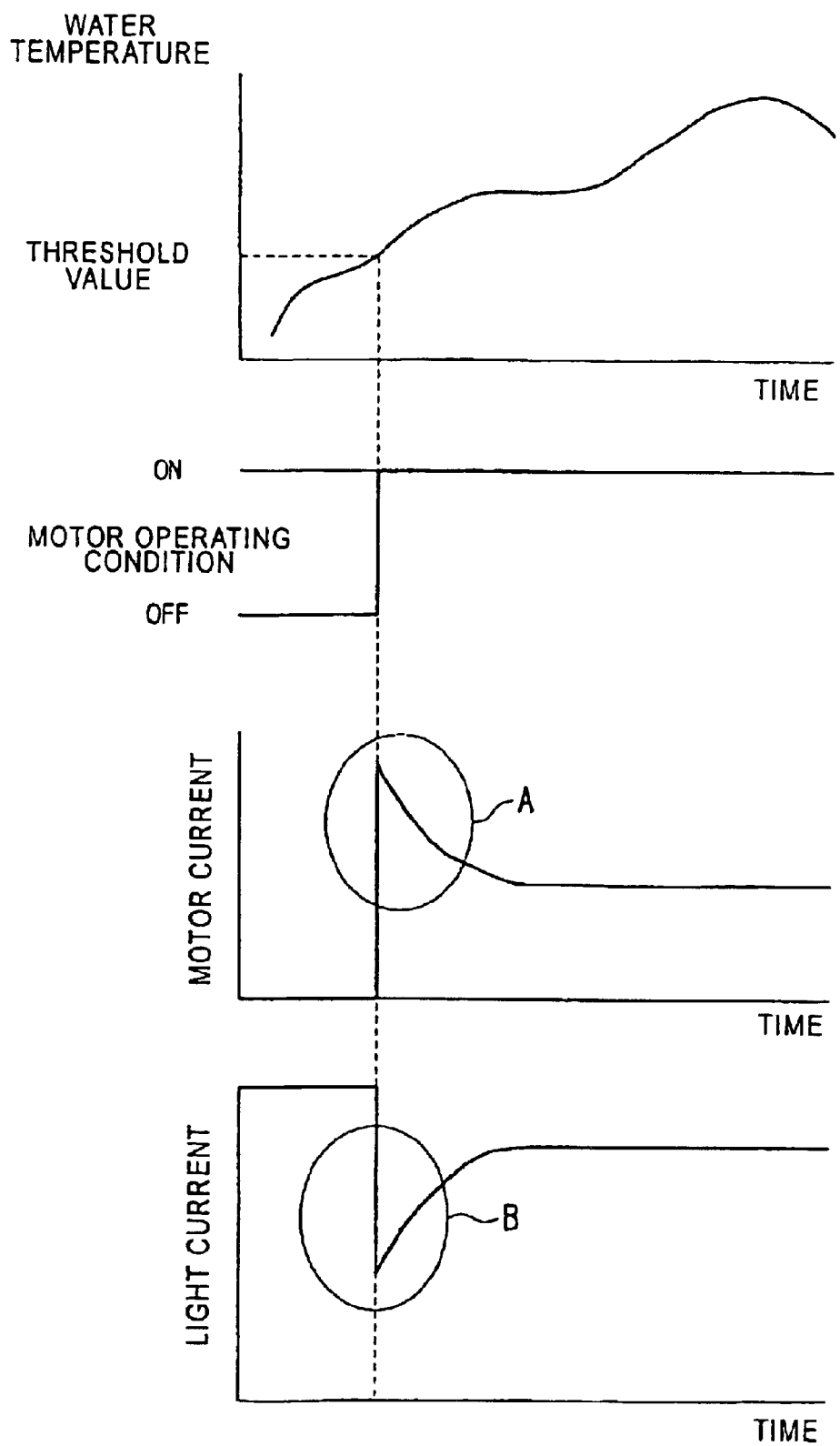
FIG. 3 is a diagram showing, in a vehicle according to the background art, the time-varying water temperature value of a radiator, the time-varying ON/OFF of the driving current of a fan motor, the time-varying current value of the fan motor, and the time-varying voltage value of a light fixture.

Referring to the accompanying drawings, the operation of the light fixture control system of one embodiment will be described. FIG. 2 is a diagram showing, in the process of duty control by the light fixture control system of one embodiment, the time-varying water temperature value of the radiator, the time-varying ON/OFF of the driving current of the fan motor, the time-varying current value of the fan motor, and the time-varying voltage value of the light fixture.

Assuming that, in response to an input of the water temperature value of the radiator from the water temperature sensor 7, the ECU 6 determines that the value is equal to or smaller than the threshold value, and sets the motor current of the fan motor 5 to 0. In this case, with respect to the generator 1, a predetermined stationary current is flowing in the headlight 3 or the taillight establishing a parallel connection with the fan motor 5.

Due to an increase in the temperature of the engine as being the heat source, if the water temperature flowing in the radiator is increased, and if the water temperature value as a result of measurement by the water temperature sensor 7 exceeds a predetermined threshold value, the ECU 6 presumably receives an input of the temperature information from the water temperature sensor 7, and determines that the water temperature value in the temperature information has reached the predetermined threshold value through comparison with the threshold value. In this case, the ECU 6 starts the duty control for the energization time with respect to the fan motor 5. That is, as shown in FIG. 2, based on the lapse of time after the duty control is started, the ECU 6 gradually increases the energization time of the driving current to the motor. In the FIG. 2 example, a case of increasing the energization time from 10% to 100% in a step-by-step manner is illustrated.

That is, the duty ratio of the energization time in a predetermined time period (1 second) is increased at a predetermined rate (0.1) on a predetermined time period (1 second) basis.

The duty ratio is expressed by H/(H+L), and takes a value in the range from 0 to 1, based on the time periods when the driving current to the motor is H or L.

In the embodiment:

1st second: (ON time 1 ms, OFF time 9 ms)×100 times;

2nd second: (ON time 2 ms, OFF time 8 ms)×100 times; and

3rd second: (ON time 3 ms, OFF time 7 ms)×100 times.

Thereafter, the ON time is added by 1 ms for every second, and the OFF time is deducted by 1 ms therefore.

The ECU 6 executes such duty control as follows:

9th second: (ON time 9 ms, OFF time 1 ms)×100 times

9th second and onward: 100% energized.

Therefore, the current flow to the fan motor 5 is gradual, and thus no inrush current occurs. Accordingly, no rapid voltage drop from any predetermined stationary voltage is observed for the headlight 3 or the taillight, effectively suppressing to a minimum the dimming often caused thereby.

It should be noted that the present invention is not restrictive to the above embodiment, and although the description is made of a motorcycle, it is applicable to a four-wheel buggy as well, for example. Furthermore, although the motorcycle described above has no battery, the present invention is applicable to a motorcycle or automobile including a battery.

As described in the foregoing, according to the present invention, when the light fixture is on, and the motor receives an input of the driving current from the same generator as for the light fixture, the current supply can be gradually increased by duty control. Accordingly, derived thereby are the effects that no inrush current occurs at the time of motor activation, and the light fixture does not rapidly dim.

According to the present invention, when the light fixture is on, and the motor receives an input of the driving current from the same generator as for the light fixture, the current supply can be gradually increased by duty control based on the lapse of time after the duty control is started. Accordingly, derived thereby are the effects that the dimming rate of the light fixture based on the lapse of time after the duty control is started can be controlled without the user noticing, and the inrush voltage at the time of motor activation can be controlled.

Furthermore, according to the present invention, the voltage applied to the motor is the same as the voltage input to the light fixture from the same generator as for the light fixture. Accordingly, although there is a possibility of causing an inrush current larger than the case where the motor is connected serially to the light fixture with respect to the generator, derived thereby are the effects that any inrush current is prevented in a more effective manner from occurring at the time of motor activation, and the light fixture is prevented from rapidly dimming.

According to the present invention, in a fan motor which frequently switches the motor operating condition between ON and OFF in response to the temperature change of the heat source, when the light fixture is on, the current supply can be gradually increased by duty control. Accordingly, derived thereby are the effects that the inrush current occurring at the time of motor activation can be prevented in a specifically effective manner, and the light fixture is prevented from rapidly dimming.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light fixture control system having a connection established with a light fixture to be driven by an output of a generator of a vehicle and a motor to be driven also by the output of the generator, and controlling a driving current provided to the light fixture and the motor, wherein the driving current to the motor is duty-controlled at the time of driving the light fixture.

2. The light fixture control system according to claim 1, wherein, based on a lapse of time after the duty control is started, an energization time is increased to provide the driving current to the motor.

3. The light fixture control system according to claim 1, wherein between the light fixture and the motor, a parallel connection is established with respect to the generator.

4. The light fixture control system according to claim 1, wherein the motor is a fan motor provided adjacent to a heat source.

5. The light fixture control system according to claim 4, wherein the heat source is a radiator of the vehicle, said fan motor being driven by the generator to air-cool the radiator.

6. The light fixture control system according to claim 5, further comprising a water temperature sensor for measuring water temperature of water in the radiator, said water temperature sensor providing temperature information to a control unit of the light fixture control system.

7. The light fixture control system according to claim 1, wherein no battery is provided in the light fixture control system.

8. The light fixture control system according to claim 1, further comprising a regulator, said regulator being connected to the generator to convert a voltage output from the generator into a voltage value required by the motor and light fixture.

9. A control system, comprising:

a control unit;

a generator;

a light fixture connected to said control unit and said generator, said light fixture being driven by an output of said generator;

a motor connected to said control unit and said generator, said motor being driven by an output of said generator, wherein said control unit controls a driving current to the light fixture and the motor, and the driving current to the motor is duty-controlled at the time of driving the light fixture.

10. The control system according to claim 9, wherein, based on a lapse of time after the duty control is started, an energization time is increased to provide the driving current to the motor.

11. The control system according to claim 9, wherein between the light fixture and the motor, a parallel connection is established with respect to the generator.

12. The control system according to claim 9, wherein the motor is a fan motor provided adjacent to a heat source.

13. The control system according to claim 12, wherein the heat source is a radiator of a vehicle, said fan motor being driven by the generator to air-cool the radiator.

14. The control system according to claim 13, further comprising a water temperature sensor for measuring water temperature of water in the radiator, said water temperature sensor providing temperature information to the control unit.

15. The control system according to claim 9, wherein no battery is provided in the control system.

16. The control system according to claim 9, further comprising a regulator, said regulator being connected to the generator to convert a voltage output from the generator into a voltage value required by the motor and light fixture.

* * * * *